United States Patent [19]

Lindacher et al.

[11] Patent Number: 5,179,271
[45] Date of Patent: Jan. 12, 1993

[54] COMPACT OPTICAL SCAN PATTERN GENERATOR FOR BAR CODE READING SYSTEMS

[75] Inventors: Joseph M. Lindacher, Cambridge, Ohio; Charles K. Wike, Jr., Sugar Hill, Ga.

[73] Assignee: NCR Corporation, Dayton, Ohio

[21] Appl. No.: 762,703

[22] Filed: Sep. 19, 1991

[51] Int. Cl.[5] .................. G06K 7/10; G02B 26/10
[52] U.S. Cl. .................. 235/467; 235/462; 359/216; 359/219
[58] Field of Search ............. 235/467, 462; 359/216, 359/217, 218, 219

[56] References Cited

U.S. PATENT DOCUMENTS

| | | | |
|---|---|---|---|
| 3,995,166 | 11/1976 | Hobart et al. | 250/566 |
| 4,043,632 | 8/1977 | Jeffery et al. | 359/217 |
| 4,057,784 | 11/1977 | Tafoya | 235/467 |
| 4,097,729 | 6/1978 | Seligman et al. | 235/467 |
| 4,333,006 | 6/1982 | Gorin et al. | 235/457 |
| 4,450,350 | 5/1984 | Hardy | 235/467 |
| 4,624,528 | 11/1986 | Brueggeman . | |
| 4,795,224 | 1/1989 | Goto | 235/467 |
| 4,938,551 | 7/1990 | Matsumoto . | |
| 5,000,529 | 3/1991 | Katoh et al. | 235/467 |

Primary Examiner—Carolyn E. Fields
Assistant Examiner—Drew A. Dunn
Attorney, Agent, or Firm—Richard W. Lavin

[57] ABSTRACT

A compact optical scanning system includes a rotating polygon having a plurality of curved mirror portions and a plurality of mirror facets, a collection mirror member having a pair of reflective surfaces and a source of scanning light beams which projects the scanning light beams at one of the reflecting surfaces in the collection mirror. By deflecting the scanning light beams off the curved mirror portions, the mirror facets and the pair of reflective surfaces, a single line scan pattern composed of a plurality of single line scan lines each located at a different focal plane will be generated to scan a bar code label. By changing the orientation of the mirror facets together with changing the radius curvature of the curved mirror portions, an axial invariant bow-tie scan pattern composed of multiple scan lines focused at a different focal plane will be generated.

13 Claims, 4 Drawing Sheets

COMPACT OPTICAL SCAN PATTERN GENERATOR FOR BAR CODE READING SYSTEMS

BACKGROUND OF THE INVENTION

The invention relates to bar code scanning apparatuses and more particularly to a bar code scanning apparatus which can generate different types of scanning patterns.

In the present-day merchandising point-of-sale operations, data pertaining to the purchase of a merchandise item has been obtained by reading data encoded indicia such as a bar code label printed on or attached to the purchased merchandise item. Scanning systems which have been constructed to read bar code labels include hand-held wands or bar code scanners which are moved across the label and stationary optical scanning systems normally located within the checkout counter in which the coded label is moved across a window in the surface of the counter constituting the scanning area of the counter, which movement is part of the process for loading the item in a baggage cart. In order to standardize the bar codes used in various point-of-sale checkout systems, the grocery industry has adapted an uniform product code (UPC) which is in the form of a bar code. While the previously cited scanning systems work well in scanning a standard size UPC label mounted on a flat surface, where the UPC label is truncated so as to be located on a small merchandise item such as a package of gum or is located on a curved surface, the reading efficiency of the above cited scanning systems becomes unacceptable.

It is therefore a principal object of this invention to provide an improved scanning system for projecting a scan pattern which provides an enhanced depth of focus at the target area allowing the reading of a label to take place irrespective of the orientation and size of the label.

It is another object of this invention to provide an improved scanning system for projecting a multiple-line pattern which will effectively read a UPC truncated bar code label.

It is a further object of this invention to provide a scanning system which is high in reader efficiency while low in cost.

SUMMARY OF THE INVENTION

In order to fulfill these objects, a scanning system is provided which includes a source of scanning light beams projected at a stationary collection mirror which includes a flat mirror portion which reflects the light beams at a plurality of curved mirror portions which are part of a rotating polygon member further having a plurality of facet mirrors. The light beams are reflected off the curved mirrors and directed back towards the collection mirror which further includes a cylindrical mirror portion which deflects the received light beams and directs them towards the facet mirrors. The facet mirrors deflect the light beams in the form of a scan pattern which scans a UPC bar code label positioned adjacent the scanning system. The light beams reflected from the bar code label are directed back towards the facet mirrors which deflect the received reflected light beams at the collection mirror which in turn will collect and focus the reflected light beams at a detector mounted adjacent the rotating polygon member. In one embodiment of the present invention, the system will generate a single line scan pattern composed of a plurality of single scan lines each projected at a different focal plane. In a second embodiment of the present invention, the scanning system will produce a bow-tie scan pattern with each scan line projected at a different focal plane.

BRIEF DESCRIPTION OF THE DRAWINGS

These and other objects, features and advantages of the invention, as well as the invention itself, will become more apparent to those skilled in the art in light of the following detailed description taken into consideration with the accompanying drawing wherein like reference numerals indicate like or corresponding parts throughout the several views in which.

DESCRIPTION OF THE PREFERRED EMBODIMENT

Figure 1:
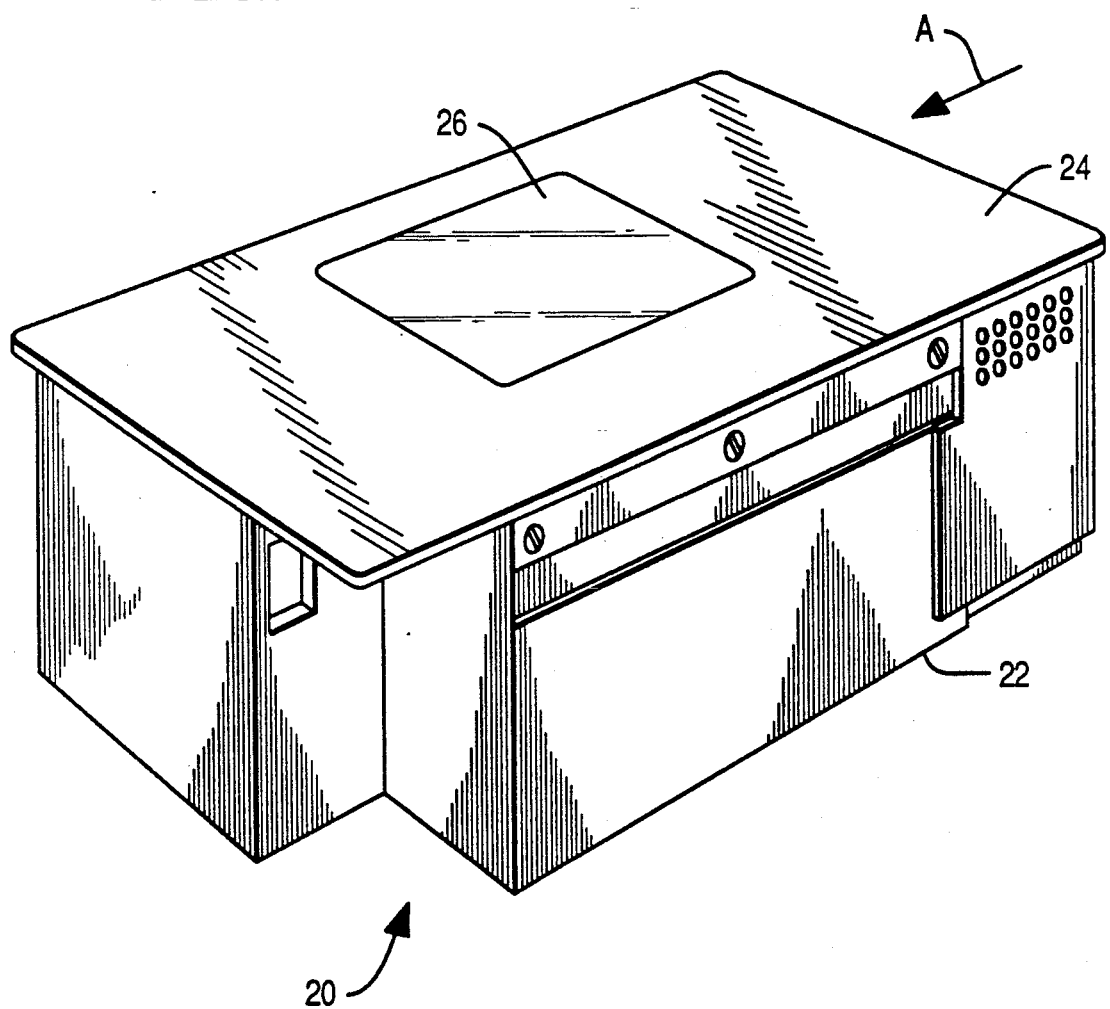
FIG. 1 is a perspective view of the compact bar code scanner of the present invention.

Referring now to FIG. 1, there is shown a perspective view of the compact bar code scanner of the present invention generally indicated by the numeral 20. The scanner 20 comprises a box-like housing member 22 which includes a cover portion 24 having located intermediate its ends a glass covered aperture 26. The housing member 22 is normally mounted within a checkout counter in which the cover portion 24 is aligned with the top supporting surface of the checkout counter. As part of a checkout operation, the operator will move a purchased merchandise item from the supporting surface of the checkout counter past the aperture 26 enabling the bar code label on the item to be scanned by scanning light beams projected through the aperture 26. While the scanning system of the present invention is shown mounted within a checkout counter, it is possible through miniaturization of the optical parts to provide a compact bar code scanning system which may be mounted within a portable hand-held scanner for generating a plurality of scan patterns.

Figure 2:
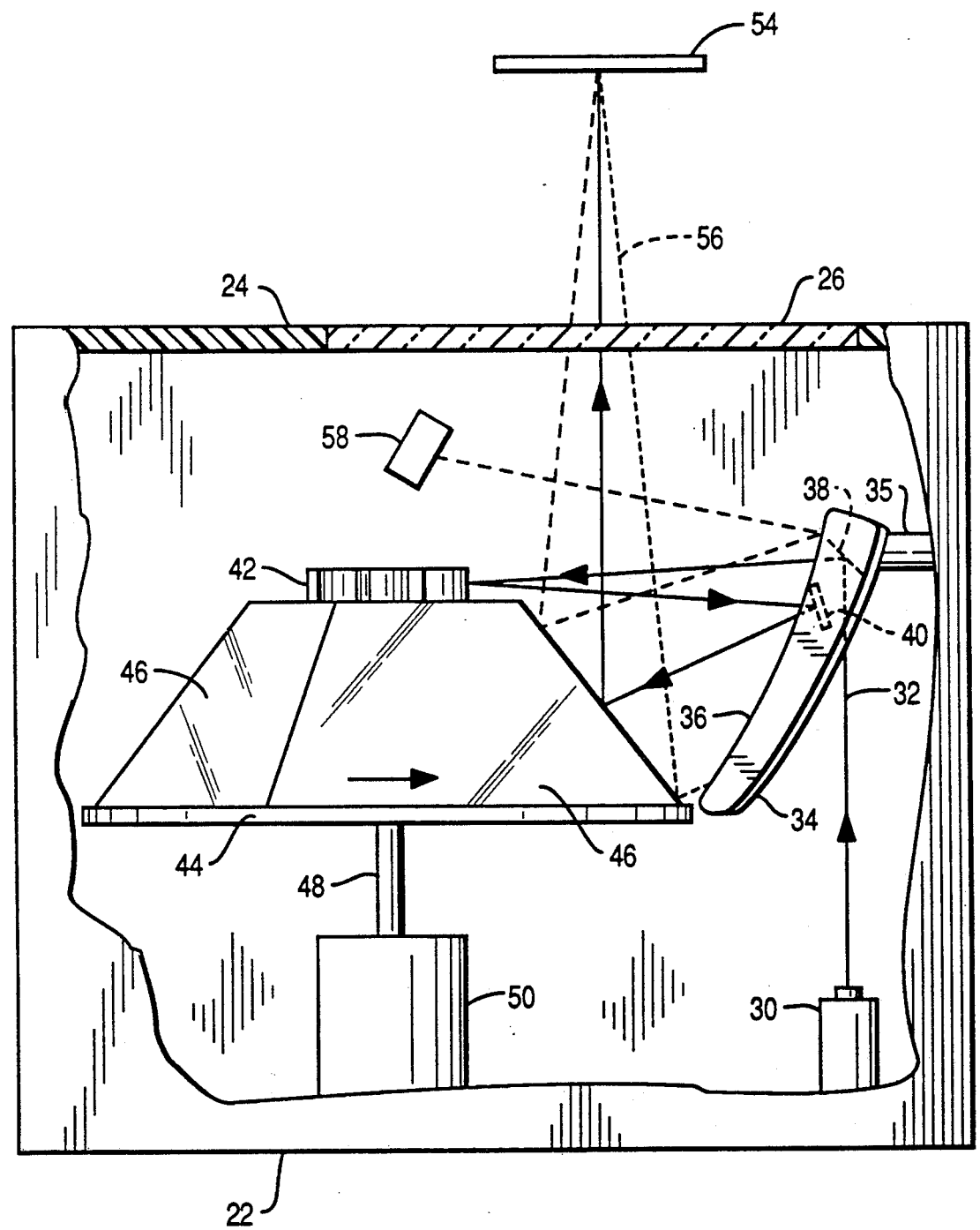
FIG. 2 is a partial sectional side view of the bar code scanner as viewed in direction A of FIG. 1 showing the paths of the scanning light beams as they are projected through the optical members of the scanning system for forming a scan pattern for scanning a bar code label.
Figure 3:
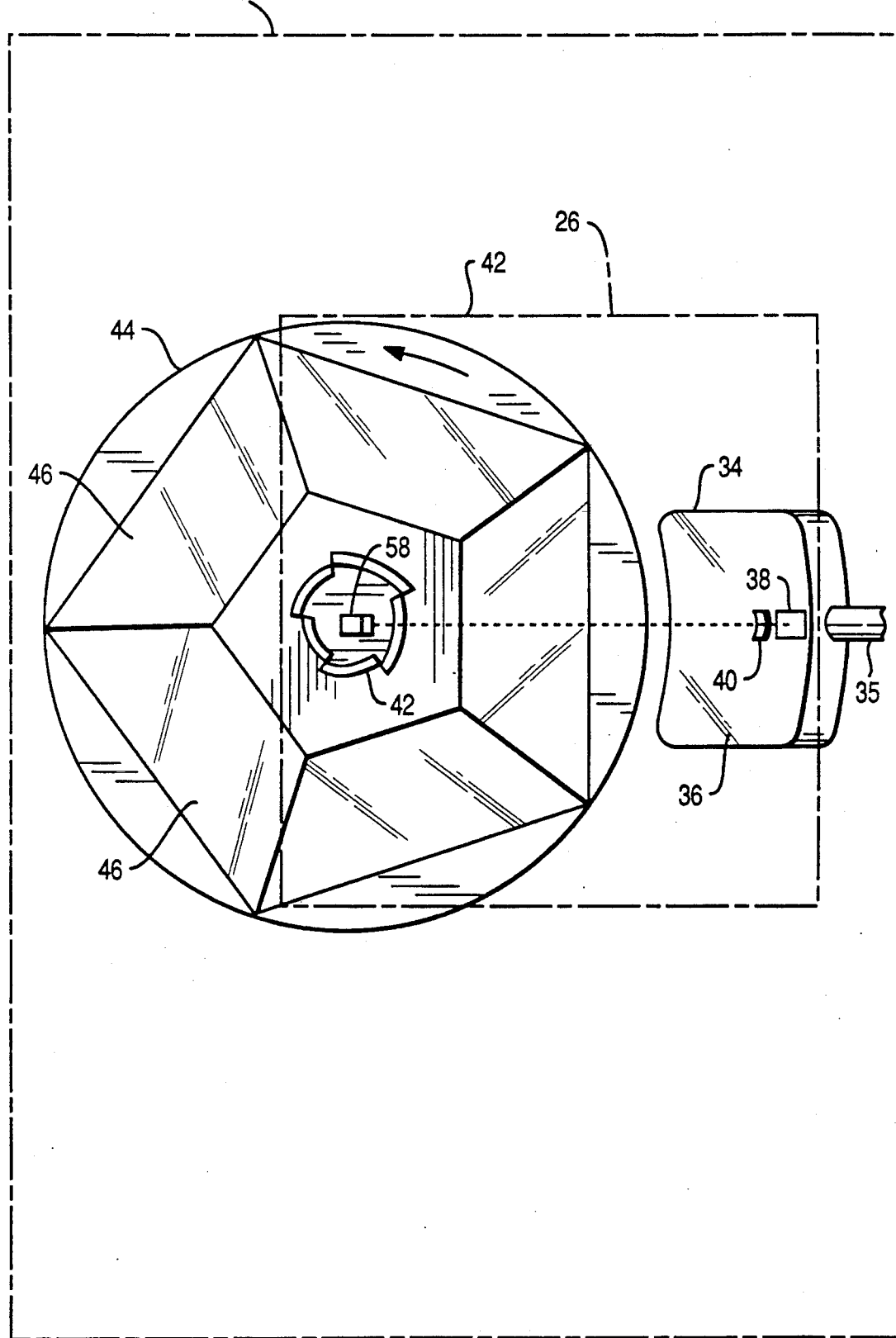
FIG. 3 is a top view of the bar code scanner of FIG. 2 showing the configuration of the curved mirror portions and the facet mirror portions of the rotating polygon member for generating a single line multi-focal scan pattern.
Figure 4:
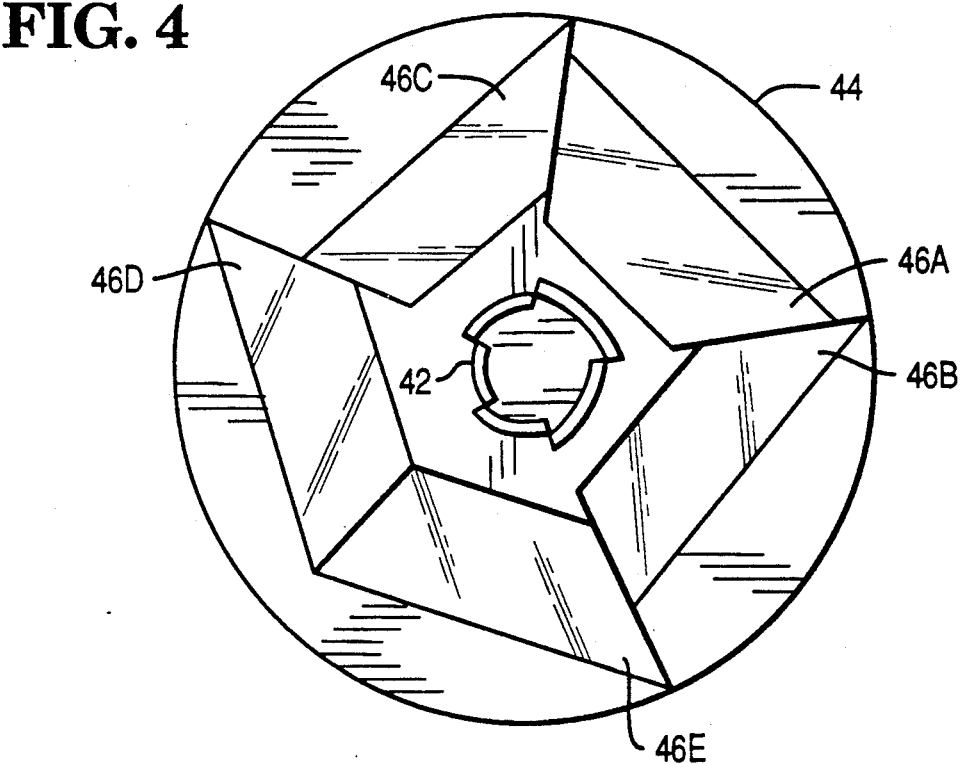
FIG. 4 is a detailed top view of a second embodiment of the rotating polygon showing the configuration of the curved mirror portions and the facet mirrors portions of the polygon member to generate a bow-tie scan pattern.

Referring now to FIG. 2, there is shown a partial sectional side view of the housing member 22 showing the arrangement of the optical elements for generating various multi-focal scan patterns. As shown, mounted within the housing member 22 is a laser member 30 projecting a coherent light beam 32 towards an elliptical shaped collection mirror member 34, supported by support member 35, which includes an elliptical collection surface 36, a flat mirror portion 38 and a cylindrical mirror portion 40 all of which are molded as a portion of the mirror member 34, The light beam 32 will strike the flat mirror portion 38 and be deflected in a generally horizontal direction towards a plurality of five curved mirror facets 42 mounted on top of a rotating polygon member 44 which further includes five angled mirror facets 46 mounted at forty-five degrees to the rotating axis of the polygon member. The distance from the center of each of the mirror facets 46 to the rotating axis of polygon member 44 is the same, which in the present example is one inch. The polygon member 44 is mounted on the drive shaft 48 of a motor 50 mounted to the floor of the housing member 22. As best shown in FIGS. 3 and 4, each curved mirror facet 42 has a different radius of curvature with respect to the center of the polygon member 44 (FIG. 3), enabling each facet to project a scan line at a different focal plane whose depth is determined by the radius of curvature.

Figure 5:
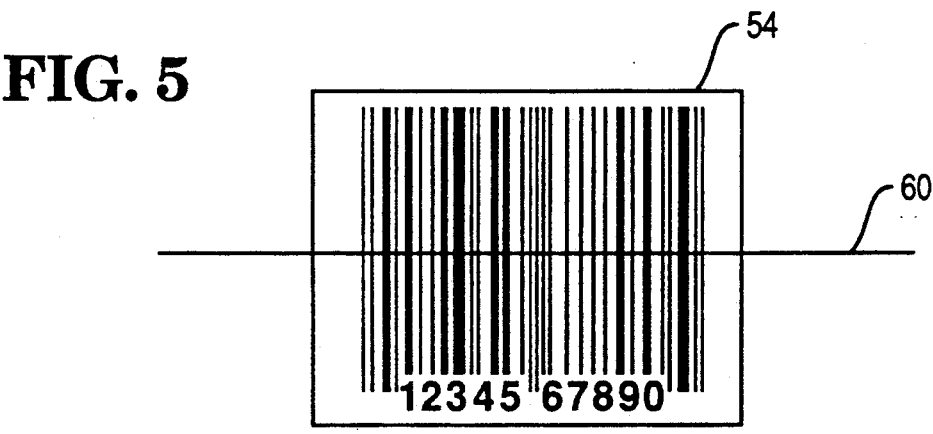
FIG. 5 illustrates the single line scan pattern generated by the polygon configuration of FIG. 3.

The laser light beam 32 reflected off the rotating curved mirror facets 42 in the form of a scan line will be directed at the cylindrical mirror portion 40 of the collection mirror member 34 which focuses the scan line in one axis, redirecting the scan line at the rotating mirror facets 46 of the polygon member 44. Since each mirror facet 46 is mounted at the same angle to the rotating axis of the polygon member 44, each facet will deflect each scan line generated by the curved mirror facets 42 through the glass covered aperture 26 in the form of a single line scan pattern 60 (FIG. 5) towards a bar code label 54 positioned adjacent the aperture 26. The light beams reflected from the scanned bar code label 54 are projected along the dotted line 56 (FIG. 2) towards the mirror facets 46 of the polygon member 44 which reflects the light beams towards the collection surface 36 of the collection mirror member 34. The mirror member 34 will collect and focus the reflected light beams at a detector member 58 mounted within the housing member 22. The variation in the position of the curved mirror facets 42 relative to the conjugate flat mirror facets 46 as well as the curvature of the curved mirror facets 42 on the polygon member 44 will determine the focal distance for each scan line generated. To vary the depth of focus of each scan line, the radius of curvature of each of the curved mirror facets 42 can be changed. In the present example, the longest mirror facet 42 has a radius of curvature of one half inch with each succeeding facet having a radius of curvature which is less than the radius of its adjacent facet by one thirty-second of an inch. The configuration of the curved mirror facets 42 and the facet portions 46 of the polygon member 44 shown in FIGS. 2 and 3 results in the generation of the single line scan pattern 60 (FIG. 4) which is composed of a plurality of single scan lines each generated by one of the curved mirror facets 42 each in a different focal plane.

Figure 6:
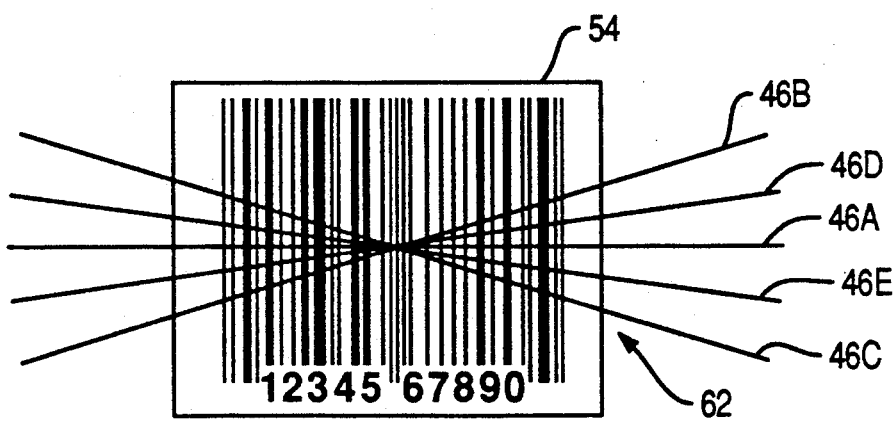
FIG. 6 illustrates the bow-tie scan pattern generated by the polygon configuration of FIG. 4 designating which facet mirror portion of the polygon member generates a scan line of the scan pattern.

Referring to FIG. 4, there is shown a second configuration of the curved mirror facets 42 and the mirror facets 46a–46e inclusive in which some of the mirror facets 46 are skewed around a vertical axis extending through the center of the facet for controlling the orientation of the scan lines in the scan pattern. The radius of curvature of each of the curved mirror facets 42 is the same as that shown in FIG. 3 but can be changed to vary the depth of focus of the scan lines. This configuration will result in the generation of the bow-tie scan pattern 62 (FIG. 6) in which each of the scan lines 46 will be in a different focal plane. As shown in FIGS. 4 and 6, the mirror facet 46a (FIG. 4) will generate the horizontal scan line 46a (FIG. 6). In similar manner, mirror facets 46c and 46d, which are skewed 5 degrees about a vertical axis, generate the scan lines 46c and 46d. The mirror facets 46a and 46e, which are skewed ten degrees about a vertical axis, generate the scan lines 46b and 46e respectively. The number of scan lines 64 that comprise the scan pattern 62 is determined by the number of curved mirror facets 42 and mirror facets 46 employed. It will be seen that by this construction, different types of multi-focal scan patterns can be generated which will be able to read different size bar code labels. Having the polygon member 44 performing three functions: changing the focus of the scan lines, generating a scan pattern and collecting the light reflected from the scanned bar code label, will simplify alignment of the optical elements by eliminating degrees of freedom for each element.

Although the preferred embodiment of the present invention has been described herein, it is not intended that the invention be restricted thereto but that it be limited only by the true spirit and scope of the appended claims.

What is claimed is:

1. An optical scanner for generating a multiple focus scan pattern comprising:
   a source of scanning light beams projected along a first light path;
   first reflecting means mounted in said first light path for deflecting the scanning light beams along a second light path;
   a rotating polygon member mounted in said second light path including a curved mirror portion located in said second light path for receiving and deflecting the scanning light beams along a third light path; and
   a second reflecting means mounted in said third light path for deflecting the light beams along a fourth light path;
   said polygon member further including a plurality of facet members located in said fourth light path for deflecting the received light beams in a direction for scanning a bar code label positioned in said direction.

2. The scanning apparatus of claim 1 in which light beams reflected from the scanned bar code label are directed at the plurality of facet members on said polygon member which deflects the reflected light beams along a fifth light path, said scanning apparatus further includes a collection mirror mounted in said fifth light path for collecting the reflected light beams from said facet members; and detector member mounted adjacent said polygon member whereby said collection mirror focuses the reflected light beams received from the facet members on said detector member enabling said detector member to generate electrical signals representing the coded data scanned on the bar code label.

3. The apparatus of claim 2 in which said first and second reflecting means are mounted on said collection mirror.

4. The scanning apparatus of claim 1 in which said curved mirror portion includes a plurality of curved mirror facets in which each curved mirror facet has a different radius curvature for generating a plurality single scan lines orientated in the same vertical plane forming a single line scan pattern with each scan line located in a different focal plane.

5. The scanning apparatus of claim 1 in which each facet member is mounted at the same radial distance from the center of rotation of said polygon member.

6. The scanning apparatus of claim 1 in which some of said facet members are rotated about a vertical axis extending through the center of the facet member to generate a plurality of scan lines orientated at a angle to each other and to a horizontal plane forming a horizontally extending scan pattern.

7. The scanning apparatus of claim 1 in which said second reflecting means comprises a cylindrical mirror member for deflecting the light beams at said facet members.

8. An optical scanning apparatus for scanning a bar code label comprising:
    a source of scanning light beams projected along a first light path;
    a lens member having an elliptical surface for collecting light beams reflected from a scanned bar code label, said lens member including first and second reflecting surfaces, said first reflecting surface located in said first light path for deflecting the light beams along a second light path;
    a rotating polygon member mounted adjacent said lens member including a curved mirror portion located in said second light path for receiving and deflecting the scanning light beams along a third light path;
    said second reflecting surface being mounted in said third light path for deflecting the light beams along a fourth light path;
    said polygon member further including a plurality of mirror facets located in said fourth light path for deflecting the received light beams in the form of a single line scan pattern in a direction for scanning a bar code label positioned adjacent said scanning apparatus.

9. The scanning apparatus of claim 8 in which the scanning light beams are reflected from the scanned bar code label and are directed at the mirror facets on said polygon member which deflect the reflected light beams towards the elliptical surface of said lens member, said scanning apparatus further including detector member mounted adjacent said polygon member whereby said elliptical surface focuses the reflected light beams received from the mirror facets on said detector member enabling said detector member to generate electrical signals representing the coded data scanned on the bar code label.

10. The scanning apparatus of claim 8 in which said curved mirror portion includes a plurality of curved mirror facets in which each curved mirror facet has a different radius curvature for generating a plurality of single scan lines orientated in the same vertical plane forming a single line scan pattern with each scan line located in a different focal plane.

11. The scanning apparatus of claim 8 in which each mirror facet is mounted at the same radial distance from the center of rotation of said polygon member.

12. The scanning apparatus of claim 11 in which some of said mirror facets are rotated about a vertical axis extending through the center of the facet member to generate a plurality of scan lines orientated at a angle to each other and to a horizontal plane forming a horizontally extending scan pattern.

13. The scanning apparatus of claim 8 in which said second reflecting surface comprises a cylindrical mirror member for deflecting the light beams at said mirror facets.

* * * * *